United States Patent
Pollard, Sr.

(10) Patent No.: US 8,459,672 B1
(45) Date of Patent: Jun. 11, 2013

(54) CABLE STEERING LINKAGE

(71) Applicant: Albert C. Pollard, Sr., Irvington, VA (US)

(72) Inventor: Albert C. Pollard, Sr., Irvington, VA (US)

(*) Notice: Subject to any disclaimer, the term of this patent is extended or adjusted under 35 U.S.C. 154(b) by 0 days.

(21) Appl. No.: 13/679,329

(22) Filed: Nov. 16, 2012

(51) Int. Cl.
*B62D 7/02* (2006.01)
*B62D 7/16* (2006.01)

(52) U.S. Cl.
USPC ............................... 280/98; 280/93.51

(58) Field of Classification Search
CPC . B62D 3/02; B62D 7/023; B62D 7/026; B62D 7/16
USPC ............. 280/91.1, 93.502, 93.504, 93.506, 280/93.508, 93.509, 93.51, 93.512, 93.513, 280/98, 771; 180/234, 240, 408, 409
See application file for complete search history.

(56) References Cited

U.S. PATENT DOCUMENTS

| | | | | |
|---|---|---|---|---|
| 2,842,376 A * | 7/1958 | Krilanovich | ................. | 180/410 |
| 3,669,466 A * | 6/1972 | Spence | ................. | 180/409 |
| 3,689,107 A * | 9/1972 | Humes | ................. | 280/426 |
| 3,820,811 A * | 6/1974 | Lapham | ................. | 280/99 |
| 4,023,434 A * | 5/1977 | Axelsson | ................. | 74/496 |
| 4,244,596 A * | 1/1981 | Chung | ................. | 280/426 |
| 5,033,763 A * | 7/1991 | Daenens et al. | ................. | 280/426 |
| 5,090,512 A | 2/1992 | Mullet et al. | | |
| 5,862,874 A * | 1/1999 | Brienza et al. | ................. | 180/6.5 |
| 5,873,592 A * | 2/1999 | Daenens | ................. | 280/410 |
| 5,931,244 A | 8/1999 | Renfroe et al. | | |
| 6,877,583 B2 | 4/2005 | Shimizu | | |
| 7,308,964 B2 | 12/2007 | Hara et al. | | |
| 8,011,678 B1 * | 9/2011 | Bell et al. | ................. | 280/98 |
| 2012/0186893 A1 * | 7/2012 | Kempf | ................. | 180/251 |

* cited by examiner

*Primary Examiner* — Joseph Rocca
(74) *Attorney, Agent, or Firm* — Brian J. Teague

(57) ABSTRACT

A steering cable arrangement wherein front wheel steering drums turn at different rates to keep the axes of the front wheels intersecting with the axis of the rear wheels at a single point. The cable path between the two drums is altered by the steering cables being threaded around sheaves on an arm whose position is controlled by a cam follower following a cam slot in at least one of the drums.

6 Claims, 6 Drawing Sheets

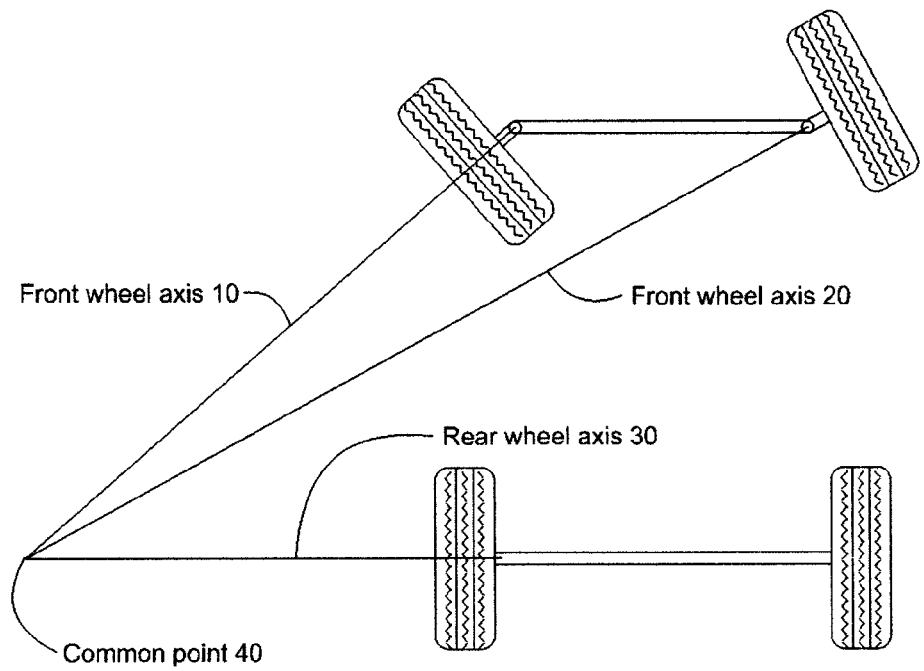
Fig 1, Prior Art
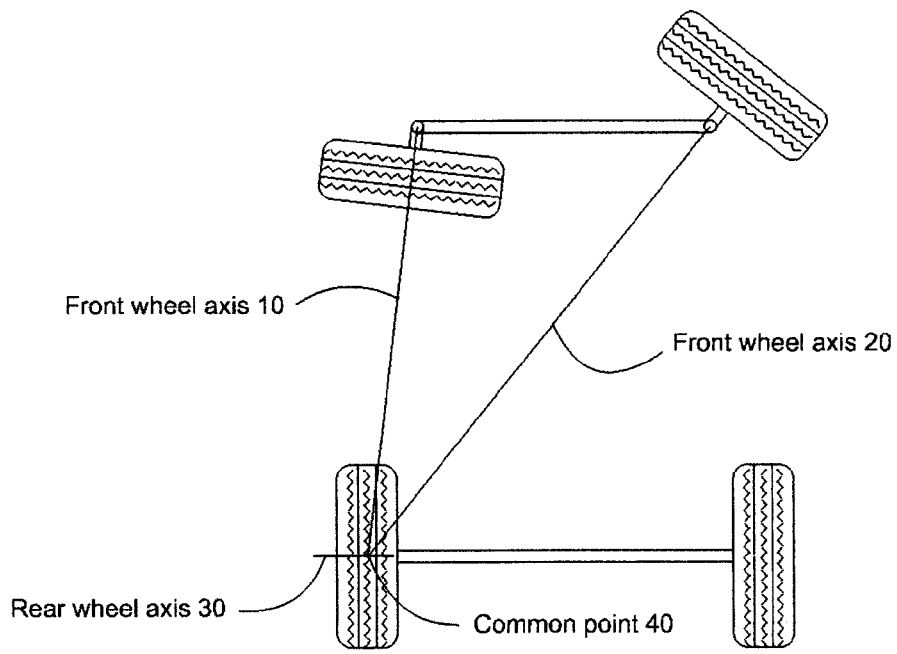
Fig 2, Prior Art

CABLE STEERING LINKAGE

CROSS-REFERENCE TO RELATED APPLICATIONS

This application is related to co-owned U.S. application Ser. No. 13/675,043, filed on Nov. 13, 2012, the contents of which are incorporated herein by reference in their entirety.

FIELD OF INVENTION

This invention relates to a cable steering linkage for vehicles.

BACKGROUND OF INVENTION

Many schemes have been devised for a linkage between two front wheels of a vehicle so that the axes of each of the front wheels intersect on a single point on the common axis of the rear wheels. This geometry is sometimes referred to as Ackerman geometry of the steering, referring to the fist inventor of a linkage that approximated this geometry. Many of these linkages are complex and expensive to manufacture, others only approximate the Ackerman geometry, and most don't accommodate a zero turning radius of a vehicle.

DRAWINGS

FIG. 1 shows the Ackerman geometry

FIG. 2 shows a vehicle turning in zero radius circle.

Figure 5A:
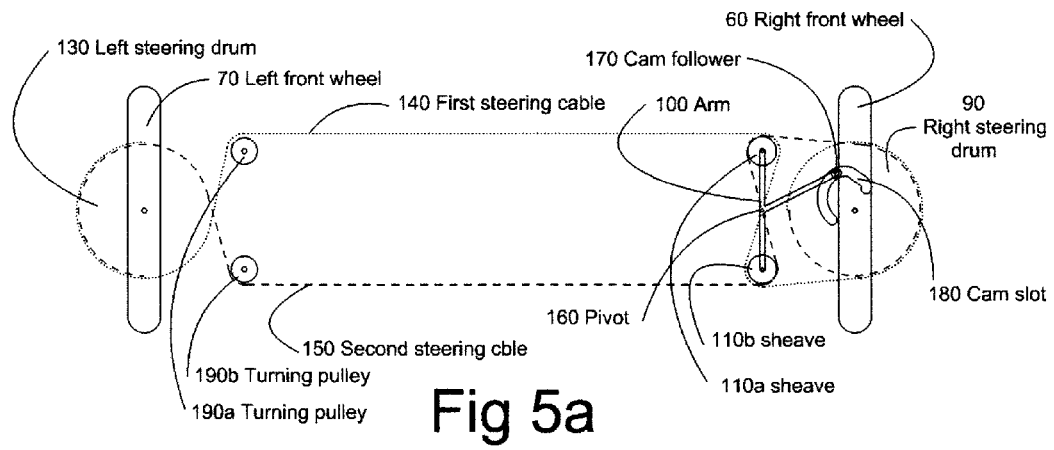
Figure 5B:
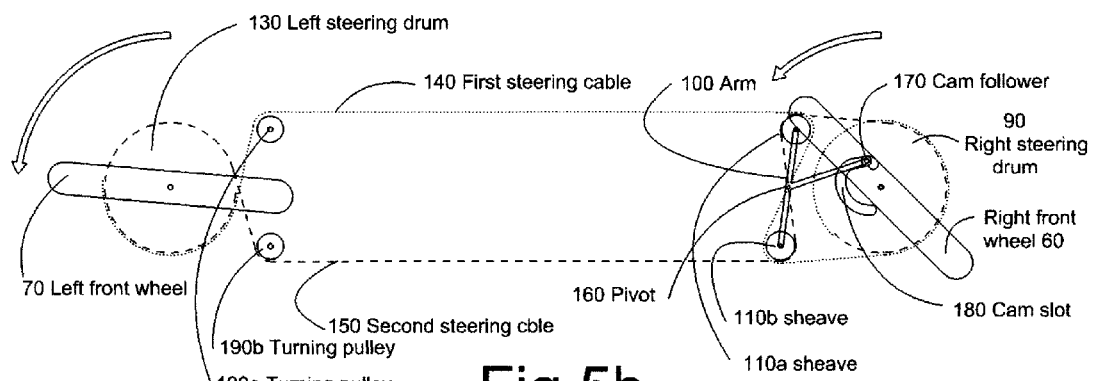

FIGS. 5a and 5b schematically show the steering mechanism 120

Figure 6:
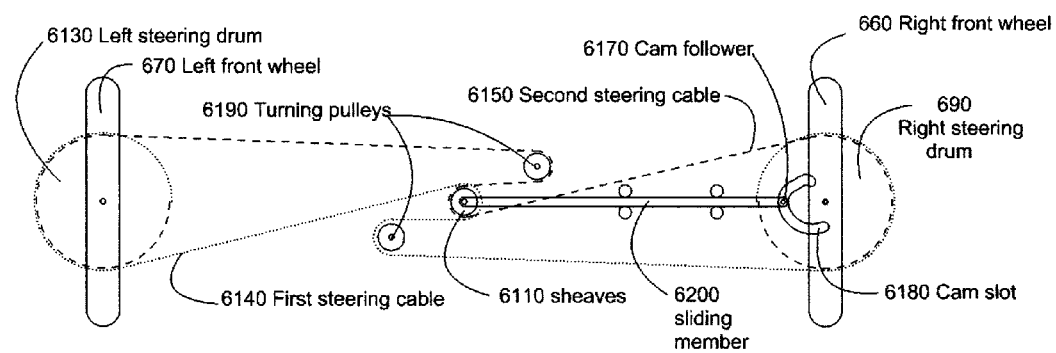

FIG. 6 shows a schematic of an arrangement with a sliding member

Figure 7:
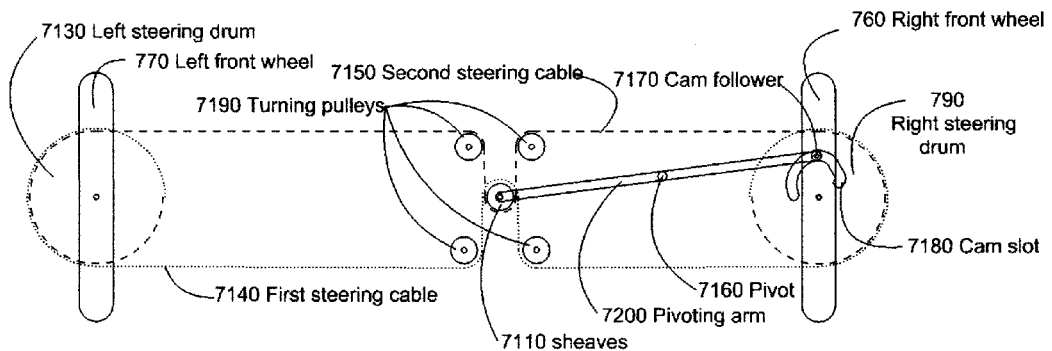
Figure 8:
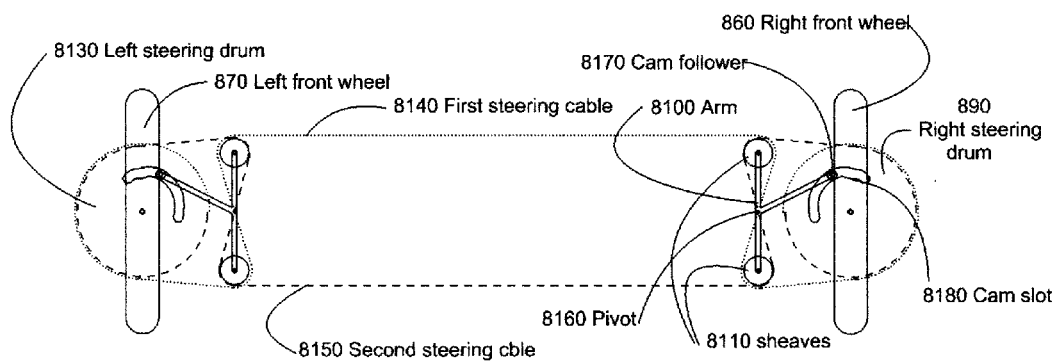
Figure 9:
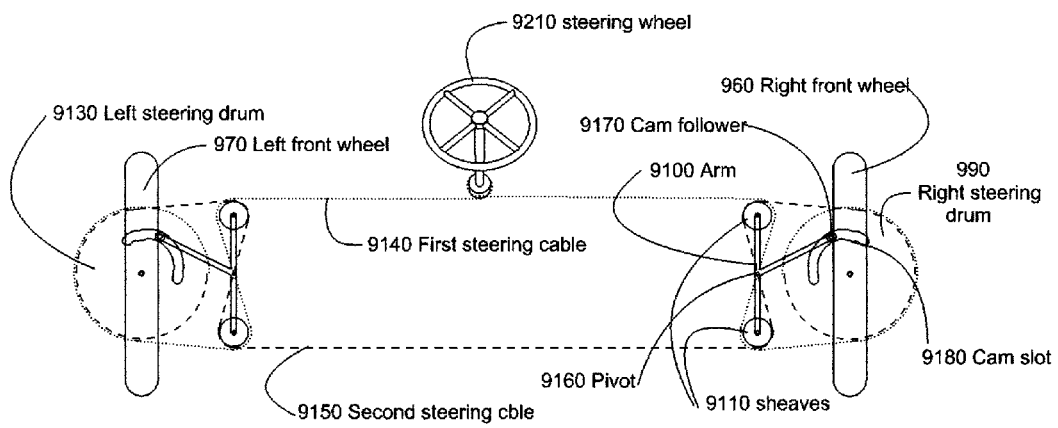

FIG. 7 shows a schematic of an arrangement similar to FIG. 6 with pivoting member FIG. 8 shows dual mechanisms of FIG. 5a FIG. 9 shows an arrangement with a steering wheel

DETAILED DESCRIPTION

This application discloses a steering mechanism to be used with the log handling apparatus disclosed in co-owned U.S. application Ser. No. 13/675,043, or with other suitable vehicles. FIG. 1 illustrates the Ackerman geometry of steering. In order for all of the wheels to roll, without any tendency to be forced to slide sideways they must have the orientation as illustrated. The left front wheel axis 10, the right front wheel axis 20 and the rear wheel axis 30 intersect a common point 40. In other words, they roll in circles with a common center. At high speeds it is not necessarily desirable for all wheels to turn in circles with a common center, however slow moving vehicles carrying heavy loads perform best when the axes of all wheels intersect at a single point. It is also desirable for some slow moving construction vehicle to be able to turn in a circle of minimum radius. FIG. 2 illustrates the wheels of a vehicle turning with one rear wheel at the center of the common circles. It is this geometry that heretofore has been difficult to achieve.

Figure 3:
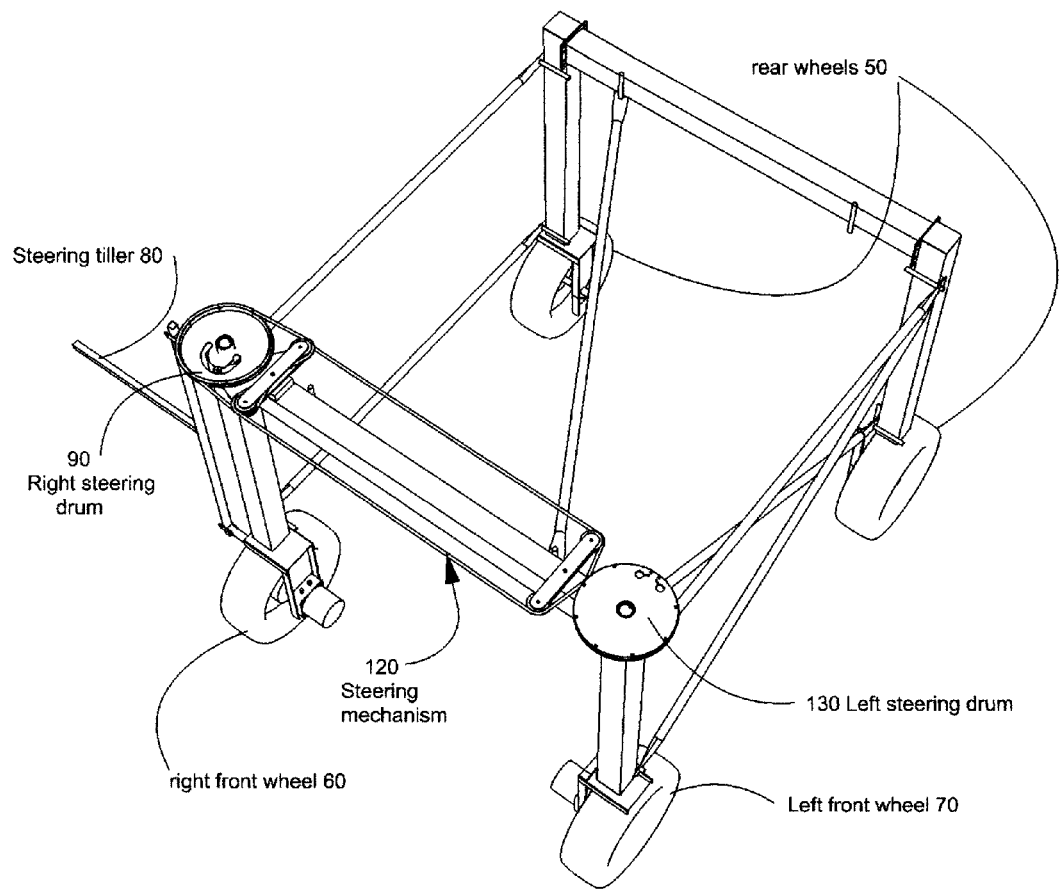
FIG. 3 is a perspective of a construction vehicle with the steering system of embodiments of the invention

FIG. 3 gives an overall view of a vehicle with the cable steering system. The vehicle may be a log handling apparatus as disclosed in co-owned U.S. application Ser. No. 13/675,043, or any other suitable vehicle. The right steering drum 90 is coupled to the right front wheel 60 by means of a steering column such that rotation of the right steering drum 90 controls the direction of the right front wheel. Likewise the left steering drum 130 is coupled to the left front wheel 70 and controls the direction of the left front wheel 70. The steering tiller 80 turns the right steering drum 90 and as a result controls the direction of the right front wheel 60. Rear wheels 50 typically do not change direction. The steering mechanism 120 is shown in detail in FIG. 4.

Figure 4:
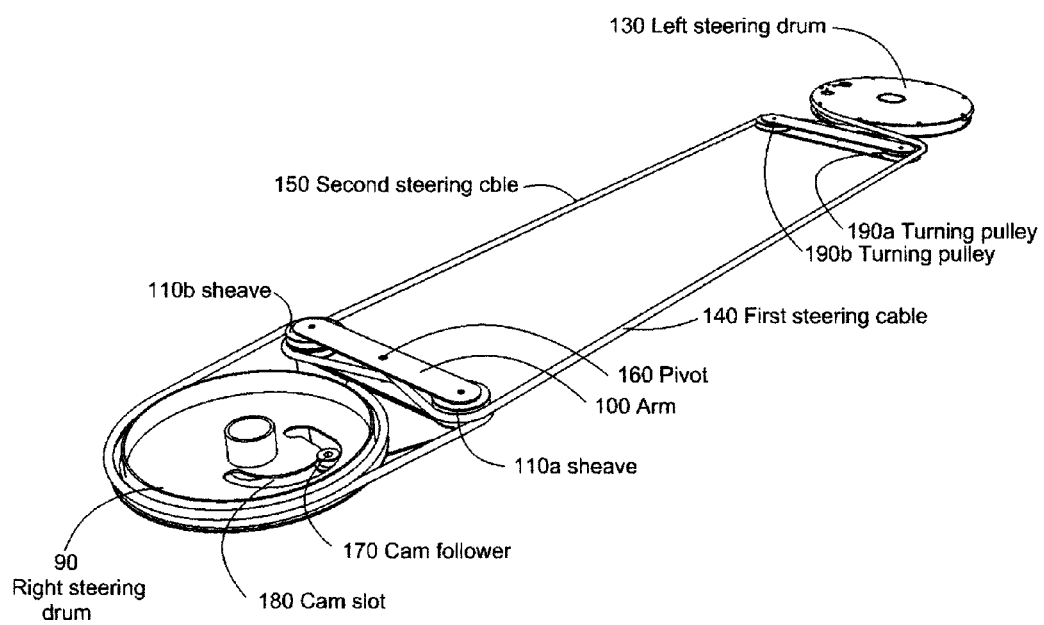
FIG. 4 shows detail perspective of the steering mechanism 120

FIG. 4 shows detail perspective of the steering mechanism 120. Right steering drum 90 is shown without a top disk so that the cam slot 180 and cam follower 170 are visible. Cam follower 170 is part of arm 100. Arm 100 rotates on pivot 160. Cam follower 170 in cam slot 180 controls rotation of the arm 100 about pivot 160. A first cable 140 affixed to the right steering drum 90 and left steering drum 130. The first steering cable 140 leaves the left steering drum 130 from a counterclockwise direction. The cable then passes around a first turning pulley 190a. This pulley is not essential to the operation of the turning mechanism however it reduces error in the path length of the steering cables. First steering cable 140 then passes clockwise around a first sheave 110a at one end of the arm 100 and then counterclockwise around a second sheave 110b at the other end of arm 100 and then onto the right steering drum in a counterclockwise direction. A second steering cable 150 affixed to the right steering drum 90 and left steering drum 130. The second steering cable 150 leaves the right steering drum 90 from a counterclockwise direction. The cable then passes counterclockwise around first sheave 110a at one end of the arm 100 and then clockwise around second sheave 110b at the other end of arm 100. Second steering cable 150 then passes around a second turning pulley 190b (which again is not essential) and then onto the left steering drum in a counterclockwise direction.

Note that the path length from where the first steering cable 140 leaves the left steering drum 130 to where it goes onto the right steering drum 90 may be changed by the angle of the arm. Similarly, the path length from where the second steering cable 150 leaves the right steering drum 90 to where it goes onto the left steering drum 130 may be changed by the angle of the arm. If the arm 100 turns clockwise on pivot 160 the path of first steering cable 140 becomes longer and thus has taken up slack in the first steering cable making it effectively shorter. At the same time, the path of second steering cable 150 becomes shorter by the same amount as first steering cable lengthens. Thus, the sum of the path lengths of the two steering cables remains essentially constant (differing only by any unintentional slack in the system). As a result the two steering drums would turn so the angle of the axis of the left front wheel to the axis of the rear axle and the angle of the axis of the right front wheel to the axis of the rear axle has changed.

In FIGS. 5a and 5b, which show the mechanism schematically, the actual steering drum surface is not shown so that the reader can more easily trace the paths of the steering cables. Also the two steering cables are shown as different line types to facilitate tracing their paths. FIG. 5a shows the steering mechanism schematically with the wheels in their straight-ahead position. FIG. 5b shows the result of turning the right front wheel 60 to the left. The cam follower 170 in the cam slot 180 caused the arm 100 to rotate clockwise about Pivot 160. This action caused the path of first steering cable 140 to be longer (and the path of second steering cable 150 to be shorter by the same amount) resulting in the left steering drum 130 turning more to the left than the right steering drum 90.

The shape of the cam slot can be determined two ways. First by empirical means, a marker may be substituted for the cam follower and a surface for the marker to mark on substituted for the surface in which the cam slot would be cut. The two front wheels are then steered according to the geometry of FIG. 1. The marker would then trace the path to be followed by the cam follower. A second way is to solve geometrically the path the cam follower should follow and plot it on the drum.

The turning pulleys 190a, 190b reduce an error that would introduced in the lengths of the paths of the steering cables were they not used. Also in practice, turnbuckles (not shown) are used to make fine adjustments to the length of the steering cables.

The essence of this invention is:
the wheels are steered by cables on drums that in turn control the direction of the wheels,
the path lengths of the cables are controlled in such a manner that when one path length gets longer the other path length gets shorter by substantially the same amount, that is the sum of the path lengths is substantially constant,
and the ratio of the path lengths is controlled by a cam on at least one of the steering drums.

ADDITIONAL EMBODIMENTS

The above discussion described an embodiment of the present invention, however there are many other arrangements of cables, drums, cams, sheaves, and pulleys that fall within the spirit of the invention.

FIG. 6 shows another such arrangement. In this arrangement left or right movement of sliding member 6200 changes the path length of first steering cable 6140 and second steering cable 6150 such that as one path becomes longer the other path becomes shorter by the same amount and consequently the cables never become slack. Cam follower 6170 (in cam slot 6180) on one end of sliding member 6200 controls the position of the sheaves 6110 so as to rotate the left steering drum 6130 and left front wheel 670 and the right front steering drum 690 and right front wheel 660 according to the Ackerman geometry. Turning pulleys 6190 are fixed. Additional arrangements might have a sliding member move top to bottom in the figure as opposed to left and right.

FIG. 7 illustrates an arrangement where a pivoting arm 7200 moves a single pair of sheaves 7110 top to bottom in the figure to lengthen and shorten first steering cable 7140 and second steering cable 7150, such that as one path becomes longer the other path becomes shorter by the same amount and consequently the cables never become slack. Cam follower 7170 (in cam slot 7180) on one end of pivoting arm 7200 (which pivots on pivot 7160) controls the position of the sheaves 7110 so as to rotate the left steering drum 7130 and left front wheel 770 and the right front steering drum 790 and right front wheel 760 according to the Ackerman geometry. Turning pulleys 7190 are fixed.

Still more arrangements can be made by using cam controlled sliding members to the turn arms with sheaves. Additional configurations may be made by using cam controlled pivoting members to actuate sliding members. Once the concept of changing cable path length is understood, the possible arrangements of parts is nearly endless, but they all fall within the spirit of this invention.

FIG. 8 illustrates an arrangement similar to FIG. 5a except two arms (each having sheaves 8110) are used instead of one. Note that the cam slots are reshaped so that each moves the arm 8100 by half the amount they did in FIGS. 5a and 5b. Like FIG. 5a, the cam follower 8170 in the cam slot 8180 causes the arm 8100 to rotate clockwise about pivot 8160. This action caused the path of first steering cable 8140 to be longer (and the path of second steering cable 8150 to be shorter by the same amount) resulting in the left steering drum 8130 (and left front wheel 870) turning more to the left than the right steering drum 890 (and right front wheel 860).

FIG. 9 is similar to FIG. 8 except that a steering wheel 9210 has been introduced. Like FIG. 8, two arms 9100 (each having sheaves 9110) are used instead of one. Each of the cam slots 9180 are shaped so that each moves the arm 9100 by half the amount they did in FIGS. 5a and 5b. Like FIG. 8, the cam follower 9170 in the cam slot 9180 causes the arm 9100 to rotate clockwise about pivot 9160. This action caused the path of first steering cable 9140 to be longer (and the path of second steering cable 9150 to be shorter by the same amount) resulting in the left steering drum 9130 (and left front wheel 970) turning more to the left than the right steering drum 990 (and right front wheel 960). With this arrangement there is symmetry turning the right or left. This concept of symmetrical arrangements could be applied to any of the schemes presented here.

CONCLUSIONS, RAMIFICATIONS AND SCOPE

As the reader can see this mechanism provides a precise and economical linkage between wheels to achieve Ackerman geometry. While there are many specifics shown in the embodiments presented here, the scope of the claims and their equivalents determine the scope of this invention. The term cable, as used in the claims, includes all flexible low-stretch linear material such as rope, line, chain and the like. In the claims, where the sum of path lengths is said to be constant, it is meant that the sum is substantially constant so that any error is not material to the operation of the mechanism.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A vehicle disposed upon a surface, said vehicle comprising:
    (a) a plurality of rear wheels, each having an axis in alignment with the other, thereby forming a rear axis line;
    (b) a first front wheel assembly comprising:
        at least one first front wheel;

a first front wheel axle forming a first front wheel axis;
a first steering column rigidly coupled to said first front wheel axle and substantially perpendicular to said surface; and
a first steering drum rigidly coupled to said first steering column;
(c) a second front wheel assembly comprising:
at least one second front wheel;
a second front wheel axle forming a second front wheel axis;
a second steering column rigidly coupled to said second front wheel axle and substantially perpendicular to said surface; and
a second steering drum rigidly coupled to said second steering column;
(d) a first cable affixed to and leaving said first steering drum from a counterclockwise direction proceeding through a first path and then to counterclockwise around said second steering drum and affixed to said second steering drum;
(e) a second cable affixed to and leaving said first steering drum from a clockwise direction proceeding through a second path and then to clockwise around said second steering drum and affixed to said second steering drum; and
(f) a means by which at least one steering drum changes and controls a length of said first path and a length of said second path such that a sum of said first and second path lengths is substantially constant and a ratio between said first and second path lengths is such that said rear axis, said first front wheel axis, and said second front wheel axis intersect at a single point regardless of a rotational direction of the at least one steering drum.

2. The vehicle of claim 1 wherein said means by which at least one steering drum changes and controls said first path length and said second path length comprises at least one cam follower disposed in at least one cam slot on said at least one said steering drum.

3. The vehicle of claim 2 wherein said means by which at least one steering drum changes and controls said first path length and said second path length further comprises at least one sheave moved by means of a linkage connecting said at least one sheave and said at least one cam follower.

4. A vehicle disposed upon a surface, said vehicle comprising:
(a) a plurality of rear wheels, each having an axis in alignment with the other, thereby forming a rear axis;
(b) a first front wheel assembly comprising:
at least one first front wheel;
a first front wheel axle forming a first front wheel axis;
a first steering column rigidly coupled to said first front wheel axle and substantially perpendicular to said surface; and
a first steering drum rigidly coupled to said first steering column;
(c) a second front wheel assembly comprising:
at least one second front wheel;
a second front wheel axle forming a second front wheel axis;
a second steering column rigidly coupled to said second front wheel axle and substantially perpendicular to said surface; and
a second steering drum rigidly coupled to said second steering column, said second steering drum comprising a cam slot;

(d) a pivoting arm disposed between said first steering drum and said second steering drum, said arm comprising:
first end sheaves coupled to a first end of said arm;
second end sheaves coupled to a second end of said arm; and
a pivot between said first end and second end, wherein an axis of said pivot, an axis of said first end sheave, an axis of said second end sheave, an axis of said first steering column, and an axis of said second steering column are all substantially parallel;
(e) a cam follower engaged in said cam slot and affixed to said pivot;
(f) a first cable affixed to and leaving said first steering drum from a counterclockwise direction proceeding clockwise around one of said first end sheaves then counterclockwise around one of said second end sheaves and then to counterclockwise around said second steering drum and affixed to said second steering drum; and
(g) a second cable affixed to and leaving said first steering drum from a clockwise direction proceeding counterclockwise around one of said second end sheaves then clockwise around one of said first end sheaves and then to clockwise around said second steering drum and affixed to said second steering drum;
wherein said cam slot is shaped such that, upon rotational movement of said second steering drum which moves said cam slot, said cam follower moves correspondingly and pivots said arm to alter a path length of said first cable and a path length of said second cable so that said rear axis, said first front wheel axis, and said second front wheel axis intersect at a single point regardless of a rotational direction of the second steering drum.

5. The vehicle of claim 4, wherein, as said arm pivots to alter said first and second path lengths, a sum of said first and second path lengths is kept substantially constant.

6. A method of steering a vehicle disposed upon a surface, said method comprising:
(1) providing a vehicle comprising:
(a) a plurality of rear wheels, each having an axis in alignment with the other, thereby forming a rear axis line;
(b) a first front wheel assembly comprising:
(i) at least one first front wheel;
(ii) a first front wheel axle forming a first front wheel axis;
(iii) a first steering column rigidly coupled to said first front wheel axle and substantially perpendicular to said surface; and
(iv) a first steering drum rigidly coupled to said first steering column;
(c) a second front wheel assembly comprising:
(i) at least one second front wheel;
(ii) a second front wheel axle forming a second front wheel axis;
(iii) a second steering column rigidly coupled to said second front wheel axle and substantially perpendicular to said surface; and
(iv) a second steering drum rigidly coupled to said second steering column;
(d) a first cable affixed to and leaving said first steering drum from a counterclockwise direction proceeding through a first path and then to counterclockwise around said second steering drum and affixed to said second steering drum; and (e) a second cable affixed to and leaving said first steering drum from a clockwise direction proceeding through a second path and then to clockwise around said second steering drum and affixed to said second steering drum; and
(2) to turn the vehicle, changing a length of said first path and changing a length of said second path such that a sum of said first and second path lengths is substantially constant and such that a ratio between said first and second path lengths is such that said rear axis, said first front wheel axis, and said second front wheel axis intersect at a single point regardless of a rotational direction of the first and second front wheel assemblies.

* * * * *